July 26, 1927.
F. BUNEVAC
1,637,101
CONVERTIBLE AUTOMOBILE BODY
Filed Aug. 16, 1926
2 Sheets-Sheet 1
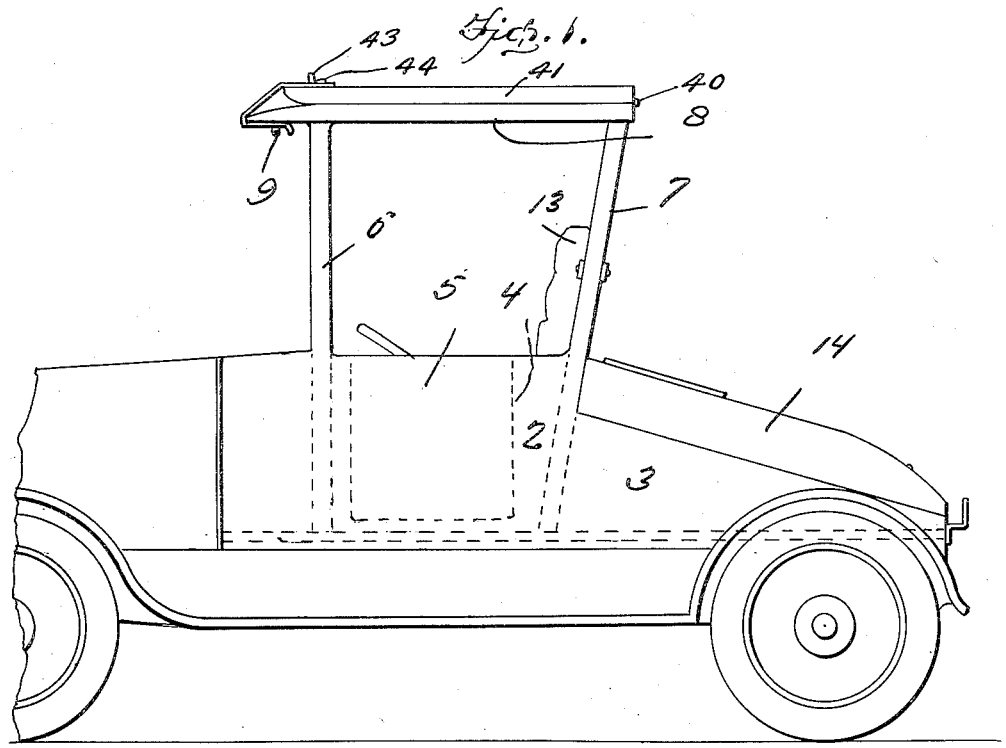
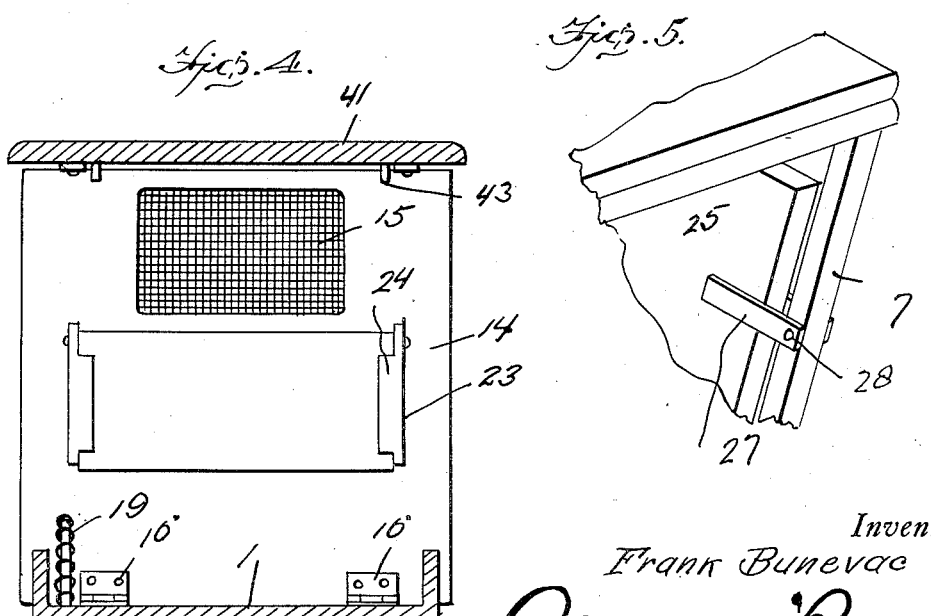
Inventor
Frank Bunevac
By Clarence A. O'Brien
Attorney July 26, 1927.
F. BUNEVAC
1,637,101
CONVERTIBLE AUTOMOBILE BODY
Filed Aug. 16, 1926 2 Sheets-Sheet 2
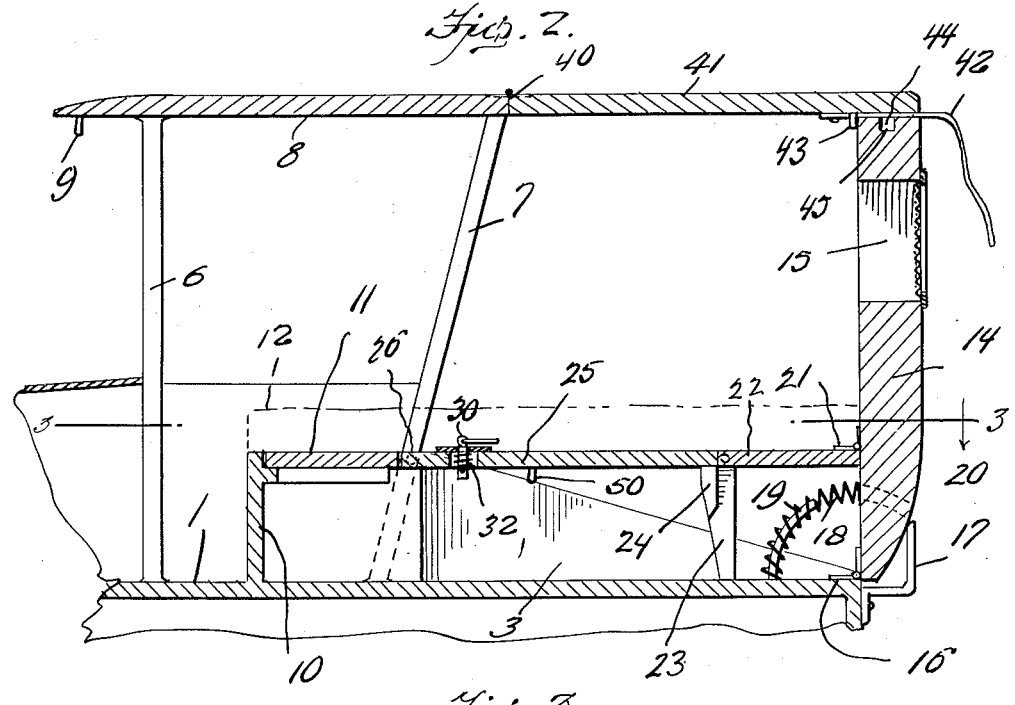
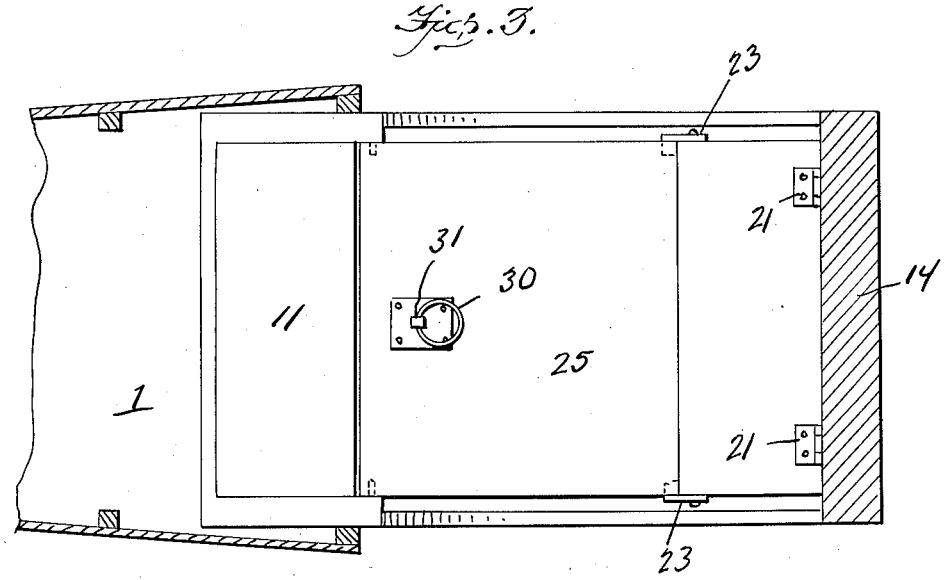
Inventor
*Frank Bunevac*
By *Clarence A. O'Brien*
*Attorney*

Patented July 26, 1927.

1,637,101

UNITED STATES PATENT OFFICE.

FRANK BUNEVAC, OF SOUTH BEND, INDIANA.

CONVERTIBLE AUTOMOBILE BODY.

Application filed August 16, 1926. Serial No. 129,419.

My present invention has to do with convertible automobile bodies; and it contemplates the provision of an automobile body adapted to be expeditiously and easily changed from roadster type to touring car and sleeping coach types, and vice versa.

To the attainment of the foregoing the invention consists in the improvement as hereinafter described and definitely claimed.

In the accompanying drawings forming part of this specification:

Figure 1 is a side elevation illustrating my novel automobile body with the parts arranged to form a body of roadster type.

Figure 2 is a longitudinal central vertical section showing the parts of the body arranged to form a body of touring or sleeping coach type.

Figure 3 is a horizontal section taken on the plane indicated by the line 3—3 of Figure 2 looking downwardly.

Figure 4 is a transverse section taken through the arrangement shown in Figure 2, looking rearwardly, and illustrating the rear shelf in idle position against the inner side of the swingable rumble member.

Figure 5 is a perspective detail view hereinafter explicitly referred to.

Similar numerals of reference designate corresponding parts in all the views in the drawings.

In the present and preferred embodiment of my invention the floor 1 of the automobile body carries side walls 2 and 3, the side walls 2 being provided with door openings 4 and equipped with doors 5. The floor 1 also carries supporting means 6 and 7 for the top of the roadster, the said top being designated by 8 and being fixed to the front and rear uprights 6 and 7. It will also be noted that the top 8 is provided at the under side of its forward portion with pendent projections 9 which are preferably headed though they may be of any other appropriate construction without affecting my invention. Between the side walls 2 is formed a hollow seat support 10 which is open at its upper side and is adapted to be normally closed by a removable seat board 11, said board 11 being made removable in order that access may be expeditiously and easily gained to the interior of the seat support 10.

Manifestly my improvement contemplates the provision of a cushion 12 on the seat support 10 and seat board 11, and also contemplates the employment of a removable back cushion 13, Figure 1.

The side walls 3 have their upper edges declined to a point adjacent the rear end of the body and the floor 1, and when it is desired to use the body as a body of roadster type, a rumble member 14 is superposed upon and supported by the said side walls 3. The rumble member 14 is provided with a preferably screened ventilating opening 15, and said rumble member 14 is hingedly connected at 16 to the floor of the major portion of the body, and consequently the rumble member is adapted to be swung from the position shown in Figure 1 to the position shown in Figure 2 and vice versa.

When the rumble member 14 is positioned as shown in Figure 2 it is braced and strengthened by one or more brackets 17 carried by the floor portion 1 of the body. I would also have it understood at this point that I prefer to employ expansion springs 18 for the purpose of facilitating the swinging of the rumble member 14 from the position shown in Figure 1 to the position shown in Figure 2. The said springs 18 bear against the inner side of the rumble member 14 and are mounted on curvilinear or arcuate guide supports 19 fixed to and extending upwardly and rearwardly from the floor 1. The rumble member 14 is apertured at 20 to receive the upper portion of the guide supports 19 when the rumble member 14 is positioned at shown in Figure 1.

Hingedly connected at 21 to the inner side of the rumble member 14 is a shelf 22 which is designed in the position shown in Figure 2 to form part of a false bottom in the body. The said shelf 22 is designed precedent to the movement of the rumble member 14 to the position shown in Figure 1 to be folded flat against the inner side of the rumble member 14; and it will also be noted that the said shelf 22 is provided with hinged legs 23 on which are lateral supporting or bracket portions 24, Figures 2 and 4. When the legs 23 are in use, as shown in Figure 2, the brackets 24 on the legs are adapted to adequately support the rear portion of a combined shelf and back 25. Said element 25 is hingedly connected at 26 between the rear uprights 7, and is designed to be swung from a position between and in coincidence with the members 7 to a position upon the brackets 24, and vice versa. When positioned between the uprights 7, the element 25 is adapted to form a back for the back cushion 13, the said element 25 being detachably secured in said position through the medium of swingable holders 27, hingedly connected at 28 to the uprights 7, and movable from the position shown in Figure 5 to positions clear of the elements 25 and at opposite sides of the uprights 7. Manifestly when the holders 27 are swung to the position alongside the uprights 7, the member 25 may be swung to and from the position shown in Figure 5, and when said element 25 is moved down to the position shown in Figure 2, the element 25 will bear upon and will be strongly supported by the brackets 24 on the legs 23. Arranged as shown in Figure 2, the shelf 22 and the combined shelf and back 25 will constitute a false bottom in the body, and said false bottom may be used to support persons or merchandise or bedding, and in this connection it will be appreciated that in conjunction with the seat board 11, the elements 22 and 25 will form a bed bottom so that the automobile body arranged as illustrated in Figure 2 may be used as sleeping quarters.

In order to facilitate manipulation of the combined back and shelf 25, the said combined back and shelf is preferably, though not necessarily, equipped with a handle 30, the said handle 30 being hingedly connected to a pin 31 which is surrounded and influenced by a coil spring 32 so as to cushion the pull exerted on the handle 30 which is preferably of ring type. When the element 25 is employed as part of the false bottom and also when said element 25 is employed as a seat back, the ring-like handle 30 is arranged in parallelism with the adjacent surface of the element 25 so as not to offer any material projection thereon.

Hingedly connected at 40 to the top 8 is an auxiliary top 41. When idle, the said auxiliary top 41 is designed to be superposed upon and supported by the top 8, Figure 1, and in this connection it will be noted that the auxiliary top 41 is equipped with apertured straps 42 which are adapted when the auxiliary top 41 is superposed upon the top 8 to be tightly engaged with the projections 9 on the top 8 so as to hold the auxiliary top 41 tight upon the top 8 and thereby avert objectionable rattling. The auxiliary top 41 is provided with projections 43 adapted to rest against the inner side of the rumble member 14, Figure 2, and said auxiliary top 41 is also provided with a dowel pin 44 adapted to rest in the socket 45 of the rumble member 14 so as to tie the member 14 and the auxiliary top 41 together when said elements 14 and 41 are relatively arranged as shown in Figure 2.

I prefer to employ the dowel pin 44 for the purpose indicated, but I do not desire to be understood as limiting myself to the said dowel pin 44 inasmuch as the same may be altogether omitted without affecting my invention, it being noted in this connection that when arranged as shown in Figure 2 the elements 22 and 25 will preclude forward movement of the rumble member 14 while the bracket 17 will support the rumble member 14 and preclude rearward movement of the said member 14 beyond the vertical position illustrated in Figure 2.

At 50 the combined back and shelf 25 is provided with a dowel pin. The said dowel pin 50 is adapted to enter and occupy the socket 45 in the rumble member 14 and thereby detachably secure the said rumble member 14 in the position shown in Figure 1. Manifestly, when the combined back and shelf 25 is swung slightly forward from the position shown in Figure 5, the dowel pin 50 will be withdrawn from the socket 45, and then the rumble member 14 may be freely swung upwardly and rearwardly to the position shown in Figure 2.

It will be apparent from the foregoing that when the parts of my improvement are arranged as shown in Figure 1, the body of the automobile will be of neat and attractive rumble type and may be used to advantage to accommodate two persons in seated posture. It will also be apparent that when it is desired to carry persons or merchandise in the rear portion of the body, the body may be converted into the coachlike body shown in Figure 2, bedding being superposed on the shelf 22, the combined shelf and back 25 and the seat board 11 so that the body may be used to advantage for sleeping quarters. When it is desired to restore the body to the state shown in Figure 1, it is simply necessary to swing the element 25 to a position between the uprights 7 and detachably secure said element 25 in said position through the medium of the holders 27, and then swing the shelf 22 against the inner side of the rumble member 14, Figure 4, and swing the legs 23 to positions in opposed relation to the ends of the shelf 22, and then swing the auxiliary top 41 forwardly and downwardly to the position shown in Figure 1, and then swing the rumble member 14 downwardly to the position shown in Figure 1, in which position the rumble member 14 will be secured against the action of the spring 18 by the before mentioned dowel pin 50 entering the socket 45.

Notwithstanding the convertible capacity attributed to my novel auomobile body, it will be appreciated that the body is simple and inexpensive in construction and is devoid of delicate parts such as are likely to get out of order after a short period of use.

I have entered into a detailed description of the construction and relative arrangement of the parts embraced in the present and preferred embodiment of my invention in order to impart a full, clear and exact understanding of the said embodiment in all of the details.

I do not desire, however, to be understood as limiting myself to the construction disclosed, my invention being defined by my appended claims within the scope of which structural changes or modifications may be made without departure from my invention.

Having thus described the invention, what I claim as new is:—

1. An automobile body having a top, an auxiliary top hinged to said top, a hinged and swingable rumble member having arcuate apertures and adapted in one position to cooperate with the auxiliary top in forming a rear coachlike portion, and spring means for facilitating upward movement of the rumble member; the said spring means comprising coiled springs abutting against the bottom of the body and the inner side of the rumble member, and arcuate supports carried by the bottom of the body and retaining said spring means in working position and arranged to be socketed in said arcuate apertures of the rumble member when said member is in its lower position.

2. An automobile body having a bottom, a top, a combined seat back and shelf hingedly mounted to be swung from an approximately vertical position in which it forms a seat back to a horizontal position in which it forms a shelf, an auxiliary top hingedly connected to the first named top, a hinged and swingable rumble member, and a shelf hingedly connected to and carried by the said rumble member and having hingedly connected legs and brackets thereon to support the rear portions of the combined seat back and shelf when in its horizontal position.

In testimony whereof I affix my signature.

FRANK BUNEVAC.